Patented July 11, 1950

2,514,640

UNITED STATES PATENT OFFICE 2,514,640

ACID CHLORIDES OF THIO AND DITHIODIGLYCOLIC ACIDS

Denham Harman and Curtis W. Smith, Berkeley, Calif., assignors to Shell Development Company, San Francisco, Calif., a corporation of Delaware No Drawing. Application October 9, 1948,
Serial No. 53,758

7 Claims. (Cl. 260—544)

This invention relates to an improved process for the production of acid chlorides of thio and dithiodiglycolic acids. More particularly, the invention provides valuable compounds, which could not be economically produced by the methods of synthesis heretofore known, and a method for their production. In a specific embodiment the invention provides hydrocarbon-substituted thio and dithiodiglycoyl dichlorides containing aliphatic multiple bonds only in the C=O groups, i. e., the alkyl and aryl substituted thio and dithiodiglycoyl dichlorides having the formulas $S[C(R)_2COCl]_2$ and $S_2[C(R)_2COCl]_2$ where each R represents a hydrogen atom, an alkyl or aryl radical.

The acyl chlorides, because of their versatility of reaction, generally constitute the most valuable intermediates or derivatives of any organic acid. The thio and dithiodiglycolic acids and certain of their derivatives, particularly their esters, are known and have been found valuable for many applications. However, it appears that the acyl chlorides of these acids have only been produced by reactions of phosphorus halides with the acids.

We have now discovered that the acid chlorides of thio and dithiodiglycolic acids are produced in good yields by bringing a ketene containing aliphatic carbon-to-carbon multiple bonds only in the C=C=O group into contact with sulfur monochloride or sulfur dichloride at temperatures at which the individual reactants are stable. Thus, the process of the invention comprises converting such ketenes to sulfur-linked diglycoyl dichlorides (thio and dithiodiglycoyl dichlorides) by bringing them into contact with a chloride of divalent sulfur (sulfur monochloride and sulfur dichloride).

The process of the invention involves an addition reaction that is not dependent upon catalysts, or elevated temperatures. The reaction may be conducted in the presence or absence of inert solvents. However, as the reaction is exothermic and many of the suitable reactants polymerize or decompose at elevated temperatures, the reaction is preferably conducted by dissolving one or both of the reactants in an inert solvent and combining them in solution. With adequate temperature control, the reaction can be conducted in the vapor-phase.

The reaction is preferably conducted under normal atmospheric pressure since the reactants are generally liquid at temperatures below their decomposition temperature. However, elevated pressures exert no adverse effect upon the reaction and reduced pressures can be advantageously employed if the reaction is conducted in the vapor-phase.

The preferred mode of conducting the process of the invention consists of introducing the ketene into a chloride of divalent sulfur dissolved in an inert solvent maintained at a temperature below the decomposition temperature of the ketene and the halide of sulfur. The proportions in which the reactants are combined can be widely varied, but the use of substantially the stoichiometric proportions is productive of good yields and is the most economical.

The inert solvent merely provides an efficient means of controlling the reaction temperature and can be employed in any desired concentration. Solvent concentrations of from about one-third to ten parts by weight of solvent to one part by weight of reactant have been found to be particularly convenient.

Inert solvents which are suitable for employment are those having a mutual solubility for the ketene and the chloride of sulfur. Illustrative examples of suitable solvents include carbon disulfide, carbon tetrachloride and chloroform; alkanes such as pentane, heptane and nonane; aromatic hydrocarbons such as benzene, toluene and mesitylene; ethers such as dimethyl ether, diethyl ether and diisopropyl ether; and esters such as ethyl acetate, methyl propionate and methyl butyrate.

In general, any ketene containing aliphatic carbon-to-carbon multiple bonds only in the C=C=O group is converted to a sulfur-linked diglycoyl dichloride by the process of the invention. Illustrative examples of ketenes which undergo this reaction include, ketene; dialkylketenes such as dimethylketene, methylethylketene, diisopropylketene and dodecylethylketene; diarylketenes such as diphenylketene, dibenzylketene, dimesitylketene, phenyl-para-tolylketene, di-para-tolylketene and mesitylphenylketene; arylalkylketenes such as methylbenzylketene, ethylphenylketene; aldoketenes such as mesitylketene and ketenes containing additional functional groups such as ethylchloroketene, ethylbromoketene, and ethylcarbophenoxyketene. In general, ketenes of from 1 to 20 carbon atoms in which a hydrocarbon nucleus contains the C=C=O group and in which the C=C=O group contains the only aliphatic multiple bonds, are preferred, particularly ketene and the ketoketenes. Ketene and its dialkyl homologs of from 1 to about 16 carbon atoms are especially suitable.

The following examples illustrate in detail the reaction of various typical ketenes when treated in accordance with the process of the invention. However, as many variations in reactants and reaction conditions are within the scope of the invention, the invention is not limited to the partcular materials and reaction conditions recited in the examples.

Example I.—Ketene and sulfur dichloride

Ketene is converted to thiodiglycoyl dichloride in accordance with the process of the invention when gaseous ketene is passed at the rate of 0.4 mole per hour into a solution of 100 grams of sulfur dichloride in 300 grams of carbon tetrachloride at —20° C. The acyl chloride is isolated by a vacuum distillation of the reaction mixture.

A sample of thiodiglycoyl dichloride prepared in the above manner was identified by stopping the reaction after four hours, adding 100 grams of ethanol to the reaction mixture and isolating and identifying the ester so produced. The production of thiodiglycoyl dichloride and the fact that this acyl chloride undergoes the class reactions of acyl chlorides was established by the identification of the ester produced from it as diethyl thiodiglycolate by the following anaylsis:

|  | Found | Calculated |
|---|---|---|
| Per cent S | 16.1, 16.2 | 15.5 |
| Per cent Cl | 0.97, 0.80 | 0.0 |
| Per cent C | 45.8(9), 45.9(3) | 46.6 |
| Per cent H | 6.7(7), 6.7(7) | 6.8 |
| Sap. no., equiv/100 grs. | 0.98 | 0.975 |
| Mol. wt. (cryo-benzene) | 206 | 206 |

Example II.—A dialkylketene and sulfur monochloride

Dimethylketene is converted to tetramethyl-dithiodiglycoyl dichloride in accordance with the process of the invention by adding 5.0 grams (0.07 mole) of dimethylketene dissolved in 40 grams of ethyl acetate to 5.0 grams (0.03 mole) of sulfur monochloride dissolved in 50 grams of ethyl acetate and maintained at a temperature of from 5 to 10° C. The acyl chloride is isolated by a vacuum distillation of the reaction mixture.

A sample of tetramethyldithiodiglycoyl dichloride prepared in the above manner was identified by allowing the reaction mixture to stand overnight at room temperature, adding 15 grams of aniline to the mixed reaction products and isolating and identifying the dianilide so produced. The production of tetramethyldithiodiglycoyl dichloride and the fact that this acyl chloride undergoes the class reaction of acyl chlorides was established by the identification of the anilide as tetramethyldithiodiglycoyl dianilide by the following analysis,

|  | Found | Calculated for ($C_{20}H_{24}N_2O_2S_2$) |
|---|---|---|
| Percent C | 60.35 | 61.82 |
| Percent H | 6.05 | 6.23 |
| Percent N | 7.10 | 7.21 |
| Percent S | 16.70 | 16.50 |

The presence of amide groupings was confirmed by the material exhibiting an infra-red adsorption in carbon tetrachloride characteristic of such groups, bands at 5.96 and 6.6μ were observed.

Example III.—A diarylketene and sulfur dichloride

Diphenylketene is converted to tetraphenyl-thiodiglycoyl dichloride in accordance with the process of the invention by adding 58.2 grams (0.3 mole) of diphenylketene dissolved in 58 grams of ether to 15.3 grams (0.15 mole) of sulfur dichloride dissolved in 15 grams of ether and maintained at —20° C. The acyl chloride is isolated by a vacuum distillation of the reaction mixture.

Example IV.—An arylalkylketene and sulfur monochloride

Benzylmethylketene is converted to sym-dibenzyldimethyl-dithiodiglycoyl dichloride in accordance with the process of the invention by adding 57.6 grams (0.4 mole) of benzylmethylketene dissolved in 58 grams of methyl propionate to 26.8 grams of sulfur monochloride dissolved in 27 grams of carbon disulfide and maintained at 20° C. The acyl chloride is isolated by a vacuum distillation of the reaction mixture.

We claim as our invention:

1. A process for the production of hydrocarbon-substituted sulfur-linked diglycoyl dichlorides containing aliphatic multiple bonds only in the C=O groups, which process comprises bringing a ketene, in which a hydrocarbon nucleus contains the C=C=O group and in which the C=C=O group contains the only aliphatic multiple bonds, into contact with a chloride of divalent sulfur.

2. A process for the production of sulfur-linked diglycoyl dichlorides containing aliphatic multiple bonds only in the C=O groups which process comprises bringing a ketene containing aliphatic carbon-to-carbon multiple bonds only in the C=C=O group into contact with a chloride of divalent sulfur.

3. A process for the production of alkyl-substituted sulfur-linked diglycoyl dichlorides, which comprises, bringing a homolog of ketene into contact with a chloride of divalent sulfur.

4. A process for the production of aryl-substituted sulfur-linked diglycoyl dichlorides, which comprises, bringing an aryl analog of ketene into contact with a chloride of divalent sulfur.

5. A process for the production of tetramethyl dithiodiglycoyl dichloride, which comprises, bringing dimethyl ketene into contact with sulfur monochloride.

6. A process for the production of tetraphenyl dithiodiglycoyl dichloride, which comprises, bringing diphenyl ketene into contact with sulfur monochloride.

7. A process for the production of thiodiglycoyl dichloride which comprises introducing ketene into a solution of sulfur dichloride dissolved in from about one-third to about ten parts by weight of carbon tetrachloride.

DENHAM HARMAN.
CURTIS W. SMITH.

REFERENCES CITED

The following references are of record in the file of this patent:

Amschutz et al., Annalen, vol. 273, p. 69 (1893).
Masson et al., J. Chem. Soc., 1940, pp. 419–425.
Reuterskiold, Chemical Abstracts, vol. 34, p. 2791.